UNITED STATES PATENT OFFICE 2,631,490

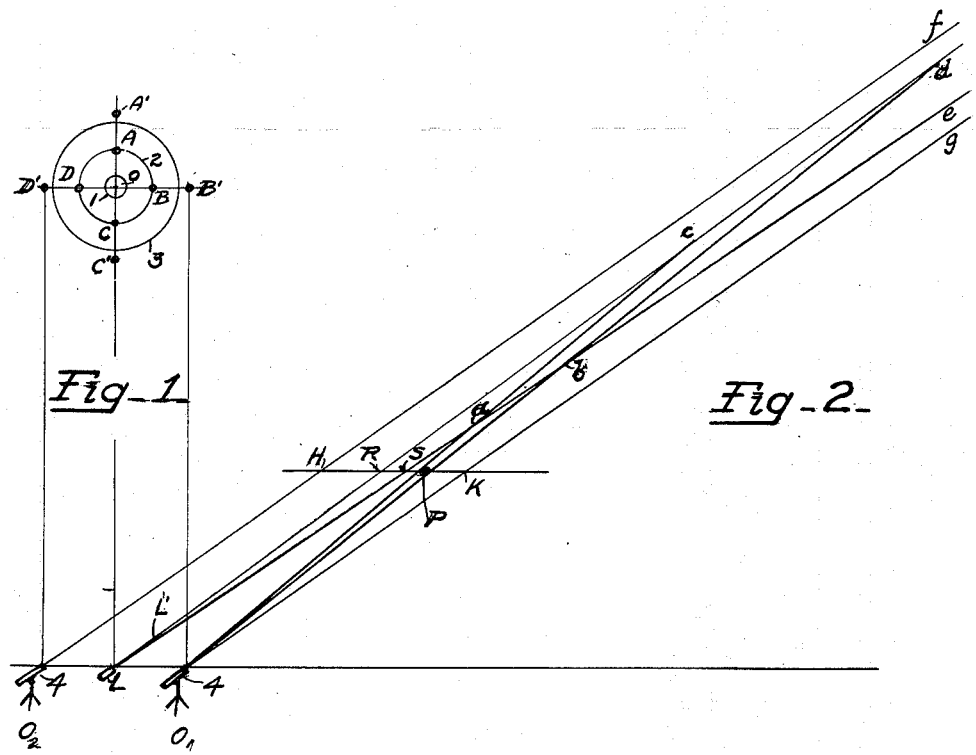
Fig. 1
Fig. 2
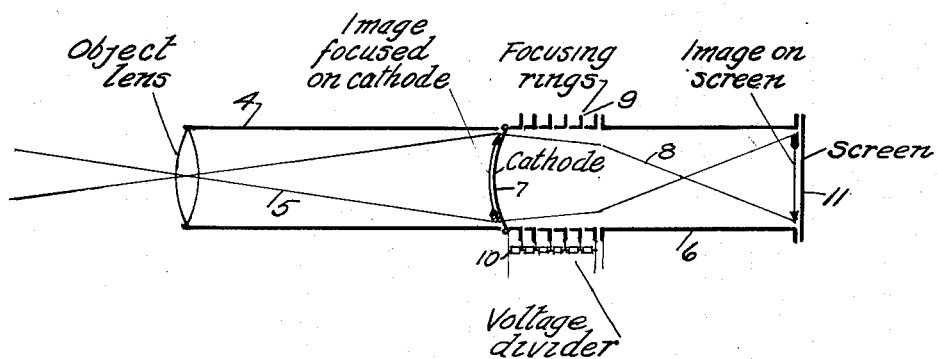
Fig. 3
Inventor
William Sackville

METHOD FOR DETECTING INVISIBLE AND NONRADIATING OBJECTS

William Sackville, United States Army, Berkeley, Calif., assignor to the United States of America as represented by the Secretary of War Application June 28, 1938, Serial No. 216,274

2 Claims. (Cl. 88—14)

(Granted under Title 35, U. S. Code (1952), sec. 266)

The invention described herein may be manufactured and used by or for the Government for governmental purposes, without the payment to me of any royalty thereon.

This invention relates to a method of and apparatus for detecting the presence and position of an invisible, nonradiating object, in which it is proposed to utilize the silhouette effect produced by an invisible nonradiating object against an equal energy background for the purpose of detecting the presence and position of the object.

New airplane designs have succeeded in shielding the exhaust manifold and other heat radiating parts so that the amount of energy from an airplane engine exposed to ground observation is only 6.5% of what it was formerly. As a result, the silhouette effect is now many times greater than the heat effect. A recent observation gave the ratio of approximately 8 to 1.

One method of detecting an object against the sky and which forms the subject matter of my pending application entitled Radiant Energy Detector, filed June 23, 1938, Serial No. 215,509, now Patent 2,459,185, consists in placing a balanced multi-element thermo-couple detector at the focus of a parabolic reflector to expose said elements to adjacent portions of the field of view of the reflector and using a visual indicator in connection with the detector, such as a galvanometer to record the effect of an object intercepting the reflector beam.

Another method which constitutes the subject matter of the instant invention, resides in projecting energy in the form of a visible or invisible searchlight beam from the ground to the sky, directing the beam to the rear of an object, to silhouette the latter against the beam and employing night glasses or an electronic telescope or similar device to visualize the object and its background.

The reflection of visible or infra-red energy from a dull black object has been found to be about 3%. All military planes in searchlight practices at present use dull black surfaces so as to present the worst conditions for discovery. The general use of this color in the future to avoid detection is certain. A black object silhouetted against a visible or invisible beam produces maximum contrast between beam and object, and the silhouette effect is of the same order of intensity as the reflection effect when the object is in the beam.

In Figure 1, point O represents a vertically disposed searchlight. Points A, B, C and D are observation stations 500 yards from O. The center circle 1 represents the horizontal projection of a cross-section of the searchlight beam at a distance of five miles from the searchlight. The intermediate circle 2 represents a horizontal projection of the end of the beam as seen by an observer at the points A, B, C and D. In this case, the line of sight of each observer to the end of the beam is parallel to the optical axis of the projector. Points $A^1$, $B^1$, $C^1$ and $D^1$ represent observers at 1,000 yards from O and the circle 3 indicates a horizontal projection of the end of the beam as seen at points $A^1$, $B^1$, $C^1$ and $D^1$. In this case, the lines of sight to the end of the beam are not parallel to the axis of the projector, but converge toward it 1.5°. Greater separations increase this convergence. This phenomenon causes the apparent end of the beam as seen from any point to be at about the same point in the beam. The line of sight to the end of the vertical beam from $A^1$ converges toward the projector axis. Now depress the searchlight beam to an elevation of 30° so as to project it directly over $A^1$. The separation of $A^1$ and the beam is now 500 yards instead of 1,000 yards, but the line of sight to the end is now parallel to the axis of the projector. Thus the ground separation of light and observation station is not the actual separation of light and observation station. The actual separation is a quantity which varies according to the setting of the projector in azimuth and in elevation. With a separation of more than 500 yards, the phenomenon referred to above places the silhouetting field within the field of view of the observing instrument.

The silhouetting method of detection may be used to locate and direct a visible beam to an invisible object. In this case night glasses are sufficient for detectors and the beam can be directed by telephone or other remote control. When it is desired to make discovery in the dark, an invisible beam (near infra-red) may be used. In this case, the detector must be capable of reproducing the beam visually so that as the beam is moved the object will always appear in silhouette against the beam.

In those methods of detecting a nonradiating, invisible object, which are carried into effect by projecting radiation for reflection from an object, collecting the reflected radiation, directing it to substance sensitive to the radiation and recording the response, it is necessary in order to obtain a maximum range, to use an extremely narrow beam which in turn precludes a wide field for search, whereas the instant method of detection allows for a large field in which to search for an invisible object. By placing the object between the beam and the observer, a blotting out of that part of the beam covered by the object takes place leaving a void in the beam pattern.

Figure 2 is a side elevation of a set-up for the silhouette method of detection. L represents a searchlight projector the beam L' of which has a 1° spread. This beam L' may be visible or invisible as desired. P represents an airplane traveling on path HK at a range of 20,000 feet from L. $O^1$ and $O^2$ are two of the four detectors systematically arranged around the projector L. The width of the beam where the plane enters is line RS, and the width of the silhouette area is line HK since lines $O_1g$ and $O_2f$ are the lines of sight from the points $O^1$, $O^2$ to the end of the beam. HK is ten times the length of RS, and the silhouetting area is therefore one hundred times the area of the beam. P is being silhouetted against the beam along the lines $a$, $b$ by an observer at $O_1$. The amount of light background covered by plane P is represented by the area $a$, $b$, $c$ and $d$.

There are many well known methods of detecting radiant energy. They vary all the way from a simple telescope to the very elaborate system of scanning in television. The system used for any particular detection by silhouette will depend upon the background stimulus, color, secrecy desired, speed and size of object, and definition. It would be of great advantage to use as detection units at $O_1$ and $O_2$ a system which would reproduce the beam background visually because facility would be had for synchronization by keeping the detector and projector oriented by eye, and the plane would appear in the bright field on the screen as a dark spot.

An excellent system for this purpose is that disclosed in the electronic telescope developed by Drs. V. K. Zworkykin and G. A. Morton and described in detail on pages 10 to 13 inclusive of the article published January 1936, in the publication entitled "Electronics."

To employ the instrument described in this publication in connection with the instant method, telescopes 4 having conventional optical systems 5 are arranged at the points $O_1$ and $O_2$ respectively. Each of the telescopes is equipped at its rear with an electronic telescope 6, as clearly shown in Fig. 3 of the drawings. With the telescopes 4 arranged in this manner and after they have been focused with respect to the scene in front of them the beam background and the dark spot of the airplane will be imaged on the semi-transparent photoelectric cathodes 7 situated at the forward end of the electronic telescopes 6 whereupon the resulting electron stream 8 through the instrumentality of the focusing rings 9 suitably energized by the voltage divider 10 will reproduce on the fluorescent screen 11, the image focused on cathode 7, as will be readily understood without further discussion.

It will thus be seen that with the aid of the conventional and electronic telescopes just referred to, the scenes in front of the telescopes may be instantly reproduced on the screens, thus visualizing infra-red images on the cathodes.

In this connection it is to be understood that the electronic telescopes just described form no part of the instant invention and have been referred to for the purpose of indicating a means by which the visible infra-red image may be visualized.

Having described my invention what I claim as new and wish to secure by Letters Patent is:

1. In the operation of an airplane detection assembly of the type utilizing a radiant energy background beam which is normally disposed in a vertical plane but adjustable in azimuth and elevation, the beam having a pre-determined beam spread and being arranged between and in equally spaced relation with respect to at least two observation stations, each station including suitable sighting instrumentalities for establishing lines of sight from the respective stations to the perimeter of the beam, the method of producing an extensive silhouetting area for airplane detection which includes the steps of depressing the beam from its normal position to one in which it projects over a selected observation station at a predetermined elevation, establishing lines of sight parallel to the axis of the beam and extending from the observation stations to the perimeter of the beam to provide a silhouetting area for each observation station, said area in length conforming substantially to the scanning range of the beam and in width being defined by the distance between the line of sight of each observation station and the adjacent edge of the beam so that an airplane traveling in a direction toward the beam and intercepting the line of sight of either station within the scanning range of the beam, will enter the silhouetting area of the station whose line of sight has been intercepted, and when viewed through the sighting instrumentality at said station, will appear in silhouette against the beam.

2. In the operation of an airplane detection assembly of the type utilizing a radiant energy background beam which is normally disposed in a vertical plane but adjustable in azimuth and elevation, the beam having a spread within the range of 1°–1.5° and being arranged between and in equally spaced relation with at least two observation stations, each station including suitable sighting instrumentalities for establishing lines of sight from the respective stations to the perimeter of the beam, the method of producing an extensive silhouetting area for airplane detection which includes the steps of depressing the beam from its normal position until it projects over a selected station at an elevation of approximately 30°, establishing lines of sight parallel to the axis of the beam and extending from the observation stations to the perimeter of the beam to provide a silhouetting area for each observation station, said area in length conforming substantially to the scanning range of the beam and in width being defined by the distance between the line of sight of each observation station and the adjacent edge of the beam so that an airplane traveling in a direction toward the beam and intercepting the line of sight of either station within the scanning range of the beam, will enter the silhouetting area of the station whose line of sight has been intercepted, and when viewed through the sighting instrumentality at said station, will appear in silhouette against the beam.

WILLIAM SACKVILLE.

REFERENCES CITED

The following references are of record in the file of this patent:

UNITED STATES PATENTS

| Number | Name | Date |
|---|---|---|
| 1,936,514 | Lengnick | Nov. 21, 1933 |
| 2,107,782 | Farnsworth et al. | Feb. 8, 1938 |